(12) United States Patent
Hui

(10) Patent No.: US 11,297,395 B2
(45) Date of Patent: Apr. 5, 2022

(54) METHODS AND SYSTEMS FOR VIDEO STREAMING

(71) Applicant: ViShare Technology Limited, Hong Kong (CN)

(72) Inventor: Ronald Chi-Chun Hui, Hong Kong (CN)

(73) Assignee: ViShare Technology Limited, Hong Kong (CN)

( * ) Notice: Subject to any disclaimer, the term of this patent is extended or adjusted under 35 U.S.C. 154(b) by 0 days.

(21) Appl. No.: 17/248,774

(22) Filed: Feb. 8, 2021

(65) Prior Publication Data

US 2021/0168463 A1 Jun. 3, 2021

Related U.S. Application Data

(62) Division of application No. 16/305,051, filed as application No. PCT/CN2017/091423 on Jul. 3, 2017, now Pat. No. 10,951,954.

(60) Provisional application No. 62/358,206, filed on Jul. 5, 2016.

(51) Int. Cl.
*H04N 7/173* (2011.01)
*H04N 21/63* (2011.01)
*H04N 21/2343* (2011.01)
*H04N 21/6373* (2011.01)
*H04N 21/8547* (2011.01)

(52) U.S. Cl.
CPC ... *H04N 21/631* (2013.01); *H04N 21/234327* (2013.01); *H04N 21/6373* (2013.01); *H04N 21/8547* (2013.01)

(58) Field of Classification Search
CPC ......... H04N 21/631; H04N 21/234327; H04N 21/6373; H04N 21/8547; H04N 21/6336
See application file for complete search history.

(56) References Cited

U.S. PATENT DOCUMENTS

| | | | | |
|---|---|---|---|---|
| 8,064,389 B2* | 11/2011 | Khan | .................... | H04L 1/0041 370/329 |
| 8,072,943 B2* | 12/2011 | Khan | .................... | H04H 20/30 370/335 |
| 8,824,304 B2* | 9/2014 | Vulkan | .................... | H04L 65/80 370/238 |
| 10,356,449 B2* | 7/2019 | Moon | .................... | H04H 60/73 |
| 10,499,278 B2* | 12/2019 | Anchan | ............. | H04W 36/0011 |
| 2007/0165104 A1* | 7/2007 | Khan | .................... | H04B 7/022 348/14.02 |
| 2007/0165566 A1* | 7/2007 | Khan | .................... | H04B 7/0669 370/329 |

(Continued)

FOREIGN PATENT DOCUMENTS

| | | |
|---|---|---|
| JP | 2000-115784 A | 4/2000 |
| JP | 2007522727 A | 8/2007 |

(Continued)

*Primary Examiner* — Michael B. Pierorazio
(74) *Attorney, Agent, or Firm* — Eagle IP Limited; Jacqueline C. Lui; Jennifer G. Che

(57) ABSTRACT

An electronic system that executes video streaming includes a video sender. The video sender converts video data into plural layers of bitstream packets with varied priorities for transmission. A bitstream packet with a lower layer of the plural layers of bitstream packets has a higher priority when being transmitted to a video receiver.

14 Claims, 10 Drawing Sheets

(56) References Cited

U.S. PATENT DOCUMENTS

| | | | | |
|---|---|---|---|---|
| 2008/0170630 A1* | 7/2008 | Falik | ............... | H04L 47/26 |
| | | | | 375/240.29 |
| 2009/0022221 A1* | 1/2009 | Xie | ............... | H04N 19/16 |
| | | | | 375/240.12 |
| 2009/0074082 A1* | 3/2009 | Xiong | ............... | H04N 19/136 |
| | | | | 375/240.27 |
| 2009/0168680 A1* | 7/2009 | Singh | ............... | H04L 65/4084 |
| | | | | 370/312 |
| 2009/0295905 A1* | 12/2009 | Civanlar | ............... | H04L 47/724 |
| | | | | 348/14.09 |
| 2010/0118760 A1* | 5/2010 | Xie | ............... | H04L 12/189 |
| | | | | 370/312 |
| 2010/0172278 A1* | 7/2010 | Nishio | ............... | H04W 52/42 |
| | | | | 370/312 |
| 2010/0172286 A1* | 7/2010 | Yoshii | ............... | H04L 5/005 |
| | | | | 370/328 |
| 2012/0198501 A1* | 8/2012 | Ruan | ............... | H04H 20/30 |
| | | | | 725/62 |
| 2017/0359607 A1* | 12/2017 | Li | ............... | H04N 21/23439 |

FOREIGN PATENT DOCUMENTS

| | | |
|---|---|---|
| JP | 2008501251 A | 1/2008 |
| KR | 10-2004-0075938 A | 8/2004 |
| KR | 10-2012-0123386 A | 11/2012 |
| KR | 10-1293372 B1 | 8/2013 |
| KR | 10-1366912 B1 | 2/2014 |
| WO | 2013145225 A1 | 10/2013 |

* cited by examiner

METHODS AND SYSTEMS FOR VIDEO STREAMING

FIELD OF THE INVENTION

The present invention relates to video processing, and more particularly to methods and systems that execute video streaming.

BACKGROUND

Streaming video or streaming media is video or media that is constantly received by and presented to an end-user or client while being delivered by a provider. Video data can be encoded and transmitted over the Internet. Rather than having to wait for an entire file being downloaded for viewing, an electronic device can regenerate the video images and audio signal by accessing the data stream while they are being transmitted. Streaming technology is particularly useful in teleconferences, sporting events, radio broadcasts, television broadcasts, and the like.

New methods and systems that assist in advancing technological needs and industrial applications in video processing such as video streaming are desirable.

SUMMARY OF THE INVENTION

One example embodiment is an electronic or computer system that executes video streaming. The system comprises a video sender that converts video data into plural layers of bitstream packets with varied priorities for transmission. A bitstream packet with a lower layer of the plural layers of bitstream packets has a higher priority when being transmitted to a video receiver.

Other example embodiments are discussed herein.

DETAILED DESCRIPTION

Figure 1:
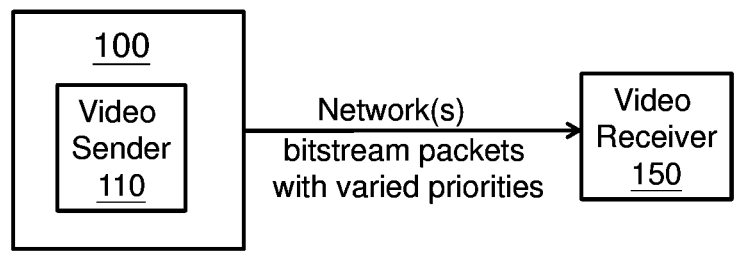
FIG. 1 illustrates a system that executes video streaming in accordance with an example embodiment.

Example embodiments relate to new methods and systems that execute video streaming in unconventional ways to improve performance for video processing in the field of video-related technologies and applications.

Video streaming, especially real-time video streaming over networks, requires low delays or latency, high video quality, and high reliability. One significant obstacle for good performance is fluctuating operating conditions of physical channels. When network bandwidth suddenly drops or there are high packet error rates (PER), it is desirable that a video streaming system adapts to packet loss and reduces data rate. Meanwhile, degradation of video quality is expected to be less noticeable and no compression artifacts should exist. The video playback is expected to be smooth without stuttering. Real-time video streaming requires more accurate video bitrate control and error resilience to enable low latency and visual lossless quality under fluctuation or change of channel conditions.

Conventional video streaming schemes are problematic in various aspects. For example, one flaw for many conventional schemes is that they do not take into account of real-time requirements of network streaming and thus have error propagation issue due to packet loss. Conventional schemes are insufficient to conceal errors without leaving some visual artifacts. As another example flaw, conventional schemes cannot effectively adapt to continuous changes of usable data rates of communication channels, and thus are unable to meet requirements (such as latency, reliability, etc.) for applications like game streaming and video conferencing. Furthermore, conventional schemes are unsatisfactory in robustness required for video streaming due to insufficient protection of data packets.

Example embodiments solve one or more of the above technical problems associated with conventional schemes for video streaming. Example embodiments provide technical solutions in new methods and systems that improve performance for video streaming in various aspects. Example embodiments achieve improved performance, such as improved latency, reliability, robustness, and picture quality, in executing video streaming by providing new technical solutions that operate in unconventional ways to contribute to video-related technology.

Example embodiments include a video streaming system that converts raw video or video data into plural layers of bitstream packets for transmission. Different policies are adopted for different layers of video packets regarding packet scheduling, modulation, packet length selection, and the like. Example system performs unequal video streaming by sending packets of more significant layers with more reliable methods and sending packets of less significant layers with higher data rate methods. Each layer of bitstream has different impact on the streamed video. For example, an example electronic system improves reliability and picture quality by guaranteeing transmission of lowest layer that is necessary for video stream to be decoded and has greatest impact on picture quality, and meanwhile transmitting as many higher layer packets as possible.

One or more example embodiments improve reliability and robustness with acknowledgement packets that indicate packet reception status such that transmission errors are adapted and error resilience is improved. As an example, example embodiments resend more significant video packets with higher priority when detecting transmission failure, and discard a video packet when the video packet is positively acknowledged or become outdated.

Example embodiments include one or more adaptive communication devices that are incorporated and employed to improve execution of video streaming by using channels of higher reliability to send packets of higher significance and using channels of higher data rate to send packets of lower significance. As an example, an adaptive communication device includes at least one network interface to provide at least one communication channel. After identifying service requirements of a video packet to be transmitted, the adaptive communication device determines how to convert a video packet to at least one low-level packet and selects one or multiple best channels for transmission. The low-level packet can be received, for example, by another adaptive communication device over one or multiple channels to regenerate original video packets.

One or more example embodiments employ error-resilient encoding and decoding methods respectively to perform block-level adaptive encoding and decoding of video frames. In some of these examples, depending on the reception status of bitstream packets, a video receiver adaptively determines whether to use higher layer bitstream packets to decode each picture blocks. A video receiver sends back acknowledgement packets to the video sender to notify the reception of each bitstream packet. An adaptive video encoder of the video sender estimates the error propagation observed by the video receiver based on the most update acknowledge information. The video sender determines the reference frame reconstruction based on estimated decoding error flags, thereby eliminating discrepancy between reference frames of the adaptive video encoder and the decoded frames of an adaptive video decoder of the video receiver and improving performance such as reliability, robustness, and picture quality accordingly.

One or more example embodiments reduces latency by providing unconventional schemes to facilitate synchronization. As an example, the video receiver controls timing of its vertical synchronization (vsync) signal of a video output interface based on the estimated vsync timing of a source video input interface, thereby reducing display latency due to asynchronous nature of the two clocks of the video input and output interfaces.

FIG. 1 illustrates a system 100 that executes video streaming in accordance with an example embodiment.

As illustrated, the system 100 includes a video sender 110 that communicates with a video receiver 150 via one or more networks. The system 100 executes video streaming with improved performance by overcoming one or more flaws of conventional schemes.

By way of example, the video sender 110 converts or transforms video data into plural layers of bitstream packets with varied priority for transmission such that a bitstream packet being a lower layer of the plural layers of bitstream packets has higher priority when being transmitted to the video receiver 150.

By way of example, the video sender 110 enables video streaming with high reliability and low latency by executing unequal video streaming. By "unequal", it means different layers of bitstream packets are prioritized and treated differently for transmission. For illustrative purpose, the video sender 110 generates different types of bitstream packets or video packets of different significance and puts more emphasis on sending more important video packets while leveraging remaining bandwidth to send less important video packets with lower priorities. When a transmission error is detected (e.g., when a video packet is not successfully received by the video receiver 150), the video sender 110 resends the more important video packets with a higher priority. Various communication protocols can be used to govern data or packet transmission. As an example, a connection oriented protocol, such as Transmission Control Protocol (TCP), is used.

In an example embodiment, the video sender 110 is connected to a video source device such as a video camera and receives video data or raw video via an interface, such as a raw video output interface. By "raw video", it means the video data that is captured, stored, or output by a video source device before being further processed (such as being compressed). The raw video, for example, can be in YUV or RGB (Red, Green, Blue) format. The raw video is processed (such as compressed or encoded) before being transmitting to the video receiver 150 for decoding and displaying. The video sender 110 encodes the video data into compressed or encoded video bitstreams with plural layers that are further converted into plural layers of bitstream packets for transmission via one or more wired or wireless networks.

As an example, the video sender 110 and the video source device are two separate devices, such as a standalone video transmission box and a BluRay player where the video transmission box is specifically designed. As another example, the video sender 110 and the video source device are integrated as a single device implementing both functions, such as a laptop with integrated video sender module that is specially designed.

In an example embodiment, the video receiver 150 is connected to a sink display device such as a television (TV). The video receiver 150 decodes bitstream packets as received and sends the decoded video to the sink display device via an interface, such as a raw video output interface.

As an example, the video receiver 150 and the sink display device are two separate devices, such as a standalone video receiver box and a TV where the video receiver box is specifically designed. An another example, the video receiver 150 and the sink display device are integrated as a single device implementing both functions, such as an Organic Light-Emitting Diode (OLED) head-mounted display with a video receiver module that is specifically designed.

In an example embodiment, when video data is being transmitted from the video sender 110 to the video receiver 150, vertical synchronization (vsync) timing between the video sender 110 and the video receiver 150 is synchronized through exchange of vsync packets, thereby reducing latency and improving performance for video streaming.

Figure 2:
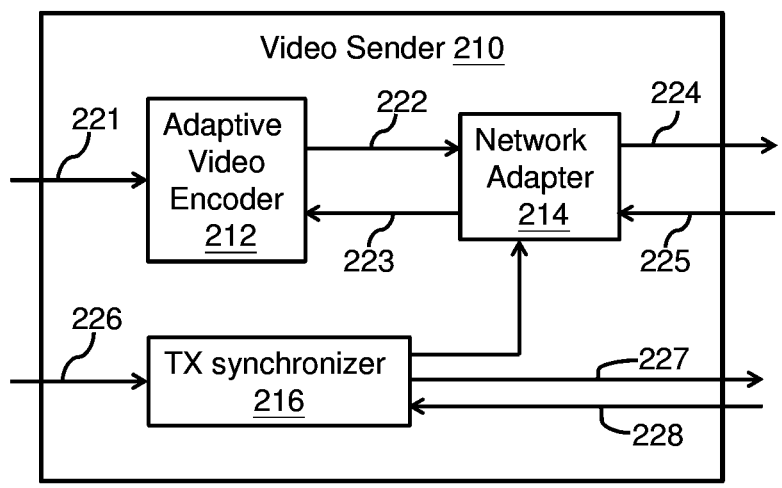
FIG. 2 illustrates a video sender in accordance with an example embodiment.

FIG. 2 illustrates a video sender 210 in accordance with an example embodiment. As illustrated, the video sender 210 includes an adaptive video encoder 212, a network adapter 214, and a transmission (TX) synchronizer 216.

By way of example, the adaptive video encoder 212 encodes video data into plural layers of video bitstreams. The network adapter 214 converts the plural layers of video bitstreams received from the adaptive video encoder 212 into plural layers of bitstream packets with varied priorities for transmission, exchanges network management packets with a video receiver to estimates usable network bandwidth, and determines multiple encoding bit rates for the plural layers of video bitstreams of the adaptive video encoder 212. The TX synchronizer 216 records vertical synchronization (vsync) time of raw video input and transmits the vsync time to the video receiver via a vsync packet.

In an example embodiment, the adaptive video encoder 212 receives raw video or video data 221 from a video source device and then compresses the video data 221 to generate multiple or plural layers of video bitstreams (also called multi-layer bitstreams) using one or more encoding algorithms such as Scalable Video Coding (SVC). For example, the multiple layers of video bitstreams include a base layer as the lowest layer and one or more enhancement layers as higher layers. The base layer is necessary for video bitstreams to be decoded and has greatest impact on video stream or picture quality. The enhancement layers are applied to improve stream quality. By way of example, for transmission purpose, a base-layer bitstream is encoded into a base-layer bitstream packet, and an enhancement-layer bitstream is encoded into an enhancement-layer bitstream packet. Lower-layer bitstream packet has a higher impact on picture quality and thus is assigned higher priority for transmission.

In one example embodiment, the adaptive video encoder 212 forwards plural layers of video bitstreams 222 (e.g., base-layer bitstreams and/or enhancement-layer bitstreams) to the network adapter 214 for further processing. In another example embodiment, the adaptive video encoder 212 receives data 223 (e.g., acknowledgement packets, bitrate estimation information, etc.) from a network via the network adapter 214. As an example, an acknowledge packet can be a positive acknowledgement or a negative acknowledgement. When a positive acknowledgement is received (i.e., positively acknowledged), it is indicated that a bitstream packet is correctly received by the video receiver. When a negative acknowledgement is received (i.e., negatively acknowledged), it is indicated that a bitstream packet is not received by the video receiver. In some examples, no acknowledgement packet is received by the adaptive video encoder 212 within a predefined period. Based on positive acknowledgements, negative acknowledgements and/or lack of acknowledgement packets within timeout, the adaptive video encoder 212 adapts to corrupted video bitstreams. As used herein, a corrupted video bitstream refers to a bitstream in which one or more bits are missing or corrupted.

By way of example, the network adapter 214 receives plural layers of video bitstreams 222 from the adaptive video encoder 212 and puts bitstreams into multiple packets for transmission. For example, the network adapter 214 is aware of the layer of each bitstream so that the network adapter 214 adopts different policies for packet scheduling, modulation, packet length selection and discarding for packets of different layers. As such, more important bitstream packets belonging to lower layers (such as base-layer packets) have a higher probability to be transmitted to the video receiver than the less important bitstream packets.

In an example embodiment, the network adapter 214 receives data or feedback 225 (e.g., acknowledgement packets, other network management packets, etc.) via a network and then forwards acknowledgement status to the adaptive video encoder 212. By way of example, if a negative acknowledgement is received or no positive acknowledgement is received within timeout, the network adapter 214 resends the more important packet with a high priority to improve reliability and error resilience. In another example embodiment, the network adapter 214 periodically performs channel bitrate estimation and informs the adaptive video encoder 221 of the latest bit rates that can be used.

By way of example, the TX synchronizer 216 keeps track of a timer counter indicating current sender system time of the video sender 210. For example, the counter updates at each sender system cycle such that the sender system cycle is determined by a crystal embedded inside the video sender 210. The video sender 210 periodically records the rising edge time of its vsync signal, which is the counter value reported by the timer counter when the video sender 210 detects rising edge of vsync signal 226 of an video input from a video source device.

In an example embodiment, the TX synchronizer 216 periodically sends its vsync time via vsync packets 227 to a reception (RX) synchronizer of the video receiver (such as the video receiver 150 with reference to FIG. 1) so that the RX synchronizer stores and updates an estimated sender system time that is very close to the actual sender system time. By way of example, the TX synchronizer 216 receives the estimated receiver system time 228 for determining whether a packet deadline is passed and the corresponding packet become outdated.

Figure 3:
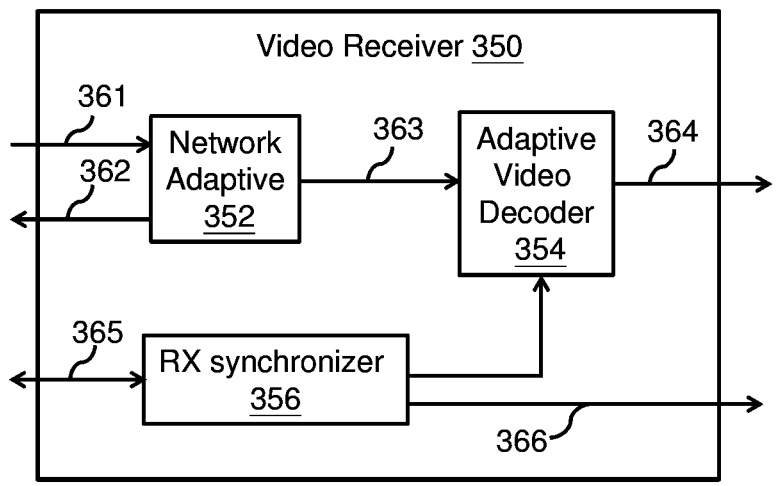
FIG. 3 illustrates a video receiver in accordance with an example embodiment.

FIG. 3 illustrates a video receiver 350 in accordance with an example embodiment. As illustrated, the video receiver 350 includes a network adapter 352, an adaptive video decoder 354, and a RX synchronizer 356.

By way of example, the network adapter 352 receives plural layers of bitstream packets from a video sender (such as the video sender 110 with reference to FIG. 1 and the video sender 210 with reference to FIG. 2) and generates an acknowledgement packet that is transmitted back to the video sender to indicate reception status of a bitstream packet of the plural layers of bitstream packets such that the video sender adapts to transmission errors. The adaptive video decoder 354 communicates with the network adapter 352 and decodes the plural layers of bitstream packets to generate decoded video data. The RX synchronizer 356 exchanges one or more vsync packets with the video sender to synchronize time between the video sender and the video receiver 350.

In an example embodiment, before video decoding starts, the RX synchronizer 356 exchanges vsync packets 365 with an adaptive video sender of the video sender to synchronize the estimated sender system time with the sender system time. For example, the RX synchronizer 356 sends its local time (e.g., receiver system time) to the video sender to facilitate receiver time or receiver system time estimation by the video sender. By way of example, the RX synchronizer 356 continuously adjusts the timing of vsync signals 366 in order to keep the latency between the vsync signal of the sink display device and the vsync signal of a video source device small and bounded.

By way of example, the network adapter 352 receives bitstream packets 361 (e.g., base-layer bitstream packets and enhancement-layer bitstream packets) from the video sender and generates positive or negative acknowledgement packets based on the received sequence numbers of bitstream packets. The network adapter 352 sends back feedback such as the acknowledgment packets 362 with a robust and low-latency method, such as sub-GHz Industrial Scientific Medical Band (ISM) band. Based on bitstream packet reception status, the adaptive video decoder 354 adaptively performs decoding for the encoded video data (such as video data of each block of a video frame) and outputs the decoded or decompressed video 364 for displaying.

Figure 4:
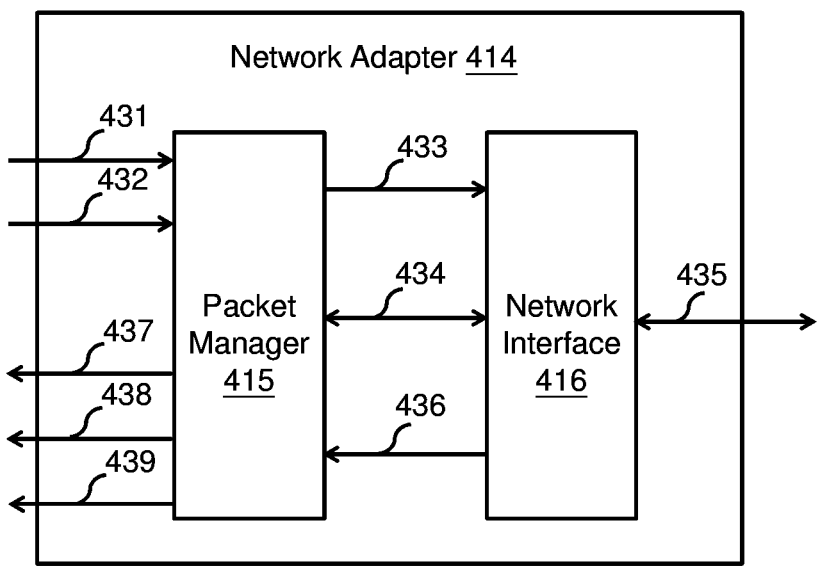
FIG. 4 illustrates a network adapter of a video sender in accordance with an example embodiment.

FIG. 4 illustrates a network adapter 414 of a video sender in accordance with an example embodiment.

As shown, the network adapter 414 includes a packet manager 415 and a network interface 416. As one example advantage, the network adapter 414 contributes to performance improvement such as improved reliability and video or picture quality by minimizing packet error rate and prioritizing transmission of bitstream packets by supporting unequal streaming in which more important packets are given higher priority for transmission.

By way of example, the packet manager 415 receives plural layers of video bitstreams output by an adaptive video encoder (such as the adaptive video encoder 212 with reference to FIG. 2), generates plural layers of bitstream packets from the plural layers of video bitstreams, and informs the adaptive video encoder to adapt to transmission errors based on acknowledgement packets received from the video receiver. The network interface 416 transmits the plural layers of bitstream packets with varied priorities to a video receiver over a network. By way of example, the plural layers of bitstream packets are prioritized for transmission such that a bitstream packet being a lower layer of the plural layers of bitstream packets has higher priority when being transmitted to a video receiver.

One or more example embodiments include at least three types of data flow relating to the packet manager 415 illustrated as follows:

1. The packet manager 415 receives plural layers of video bitstreams (e.g., base-layer video streams 431, and enhancement-layer video bitstreams 432) from an adaptive video encoder, generates bitstream packets of different layers, and performs unequal streaming to send these packets 433 (e.g., base-layer bitstream packets and/or enhancement-layer bitstream packets) to a network via the network interface 416.

2. The packet manager 415 informs the adaptive video encoder to adapt to transmission errors based on the received acknowledgement packets 436 and 439.

3. The packet manager 415 exchanges network management packets 434 and 435 with a video receiver via the network interface 416 to estimate usable network bandwidth, and then determines encoding bit rates based on the estimated usable network bandwidth and informs the adaptive video encoder of these encoding bit rates (e.g., base-layer encoding bit rates 437, and enhancement-layer encoding bit rates 438).

In an example embodiment, the packet manager 415 generates bitstream packets or video packets from incoming bitstreams of different layers (e.g., plural layers of video bitstreams output by an adaptive video encoder). As an example, the incoming bitstreams include base-layer bitstreams and enhancement-layer bitstreams whose layer is higher than that of the base-layer bitstreams. The base-layer bitstreams have a lower data rate but loss of base-layer bitstream packets (or simply called base-layer packets) has a much higher impact on picture quality. It is thus affordable to use more robust transmission methods to send these base-layer packets even though the transmission efficiency is compromised in some examples. By reducing packet error rate of base-layer packets, probability of correct transmission of base-layer packets increases, thereby increasing reliability. The enhancement-layer bitstreams have a much higher data rate but loss of these enhancement-layer bitstream packets (or simply called enhancement-layer packets) has a smaller impact on picture quality. Therefore, the higher the transmission layer is, the packet generation methods with higher data rate and higher transmission efficiency are used, even though the robustness is compromised in some examples.

In an example embodiments, more robust modulation schemes, longer forward error correction code, and shorter packet length are applied to lower layer of the plural layers of bitstream packets. The lower layer is also assigned a Quality of Service (QoS) tag such that the lower layer gets better network service.

Another example embodiment includes the following scheme for the packet manager 415 to apply various degrees of robustness, data rate and transmission efficiency for bitstream packets of different layers:

1. The packet manager 415 provides different modulation methods with different levels of robustness and data rates, such as guard interval, Binary Phase-Shift Keying (BPSK), Quadrature Phase Shift Keying (QPSK) and 64-Quadrature Amplitude Modulation (QAM), etc. The lower the video layer of a packet is, the more robust modulation method is used by the packet manager 415.

2. The packet manager 415 adds forward error correction (FEC) code of different lengths to enable a video receiver to correct bit error with FEC codes. The lower the video layer of a packet is, the longer FEC code is used by the packet manager 415.

3. A packet is corrupted if one or more bits in the packet is missing or corrupted. The packet error rate increases with packet length. Meanwhile, shorter packet length has higher percentage of overhead due to the fixed-length packet header and so the transmission efficiency is reduced. Therefore, the lower the video layer of a packet is, the shorter video packet length is chosen by the packet manager 415.

4. Quality of Service (QoS): The more important video packets are assigned a QoS tag to get better network service such as lower error rates, higher throughput, lower delay, lower jitter, etc.

Example embodiments further include packet scheduling that supports unequal streaming by prioritizing transmission of more important video or bitstream packets. When detecting a transmission failure with acknowledgement packets, the video sender (e.g., video senders 110 and 210) resends more important packets with higher priorities. By way of example, the generated video packets is first stored in one or more packet buffers to obtain buffered video packets (or called buffered bitstream packets, or buffered packets). The packet manager 415 groups the buffered packets into multiple queues such that the bitstream packets of same video layer are put in a same queue. For illustratively purpose, each video packet is assigned a display deadline.

By way of example, a buffered packet is eligible to be scheduled for transmission or retransmission if either one of the following is true (a buffered packet that is eligible to be scheduled is also called an eligible buffered bitstream packet, or eligible buffered packet, or eligible packet):

1. The network interface 416 has not selected the buffered packet for transmission yet;

2. The network interface 416 has selected the buffered packet for transmission or retransmission, but the network interface 416 has received a negative acknowledgement packet indicating that the video receiver has not received the buffered packet; and 3. The network interface 416 has selected the buffered packet for transmission or retransmission, but the network interface 416 still has not received a positive acknowledgement from the video receiver after a predefined or user-defined timeout.

In an example embodiment, the packet manager 415 employs a two-tiered scheduling method to determine which video packet or packet to be sent. The packet manager 415 scans from a packet queue or queue associated with the lowest video layer (e.g., a base layer) to a packet queue or queue associated with the highest video layer (e.g., a highest enhancement layer). The first scanned queue that has at least one eligible packet is selected for further consideration. As such, the lower a video layer is, the higher scheduling priority the video layer has. Among the eligible packets in a selected queue, the packet manager 415 further selects a packet with the earliest transmission deadline for transmission.

In an example embodiment, when a video packet cannot be sent or when the video packet is sent but is not acknowledged after the transmission deadline, the video packet becomes useless due to real-time requirement of video streaming. By way of example, it is defined that if a video packet of a layer L is not successfully transmitted to a video receiver before the display deadline associated with the video packet, it will cause an error in the layer-L decoding. In this case, the video packet that is not delivered is considered to be outdated, which indicates that the video packet can be discarded since it is not useful for decoding. By way of example, the display deadline of a video packet is roughly equivalent to the transmission deadline of the video packet since the video packet is expected to be transmitted before the display deadline to ensure good video quality or picture quality. The packet manager of a video sender estimates the receiver system time by exchanging network management packets with the video receiver. When determining whether a video packet is outdated, the packet manager checks whether the estimated receiver system time has passed the display deadline associated with a video packet. If so, the video packet is discarded. In an example, if a video packet is positively acknowledged, the video packet is discarded. In another example, a video packet is removed from a queue if the video packet is outdated or positively acknowledged.

In an example embodiment, the packet manager of a video sender determines usable network bandwidth for transmitting plural layers of bitstream packets by exchanging network management packets with the video receiver. As an example, the usable network bandwidth is a minimum network bandwidth. As another example, the usable network bandwidth is an average network bandwidth. In an example, on basis of the usable network bandwidth, the packet manager determines multiple encoding bit rates for plural layer bitstreams of an adaptive video encoder of the video sender such that at least one of following conditions (1) and (2) are satisfied: (1) base-layer bit rates are smaller than the minimum network bandwidth; and (2) total encoding bit rates are smaller than the average network bandwidth. As such, reliability and latency are improved.

By way of example, the packet manager continuously estimates effectively usable network bandwidths (i.e. bit rates that can be used to send video) by monitoring the network status and exchanging management packets with a video receiver to collect channel status statistics, such as the inter-packet latencies, channel signal strengths, bit error rates, and network propagation latencies, etc. For example, the packet manager is able to estimate the worst-case minimum network bandwidth and the expected average network bandwidth with a much higher confidence:

1. the expected average network bandwidth, $N_{avg}$
2. the expected minimum bandwidth, $N_{min}$, i.e. the network bandwidth that can be provided with a high confidence level, say 99.999% probability, where $N_{min} < N_{avg}$. By way of example, when the video sender finds the network becomes more unstable due to observation of some abnormal conditions like weaker signal strength or higher packet error rate, estimation of $N_{min}$ is adjusted to be more conservative to maintain a higher confidence level.

In an example embodiment, based on $N_{min}$ and $N_{avg}$, the packet manager informs an adaptive video encoder about allowed bit rates for different video layers. Latencies of bitstream packets depend on traffic loading, which is in turn closely related to encoding bit rates and effective network bandwidth. The video sender ensures that the encoding bit rates is smaller than the effective network bandwidth to keep the latency small or minimal. The video sender has relatively little control over channel capacity. One important parameter that can control the latency is encoding bit rates. Upon estimating $N_{avg}$ and $N_{min}$, the packet manager determines the encoding bit rates for different layers of bitstreams. By way of example, to guarantee base-layer bitstream delivery, bit rate for the base-layer bitstream is expected to be smaller than $N_{min}$. Therefore, even if the network bandwidth suddenly drops, the video sender can at least use the minimum bandwidth $N_{min}$ to send the base-layer bitstream to guarantee base-layer packet delivery under the worst-case condition. If bit rate of the base-layer bitstream is not limited below $N_{min}$, even unequal streaming cannot prevent the base-layer bitstream from overloading the network channel and compromising the streaming performance.

In an example, the enhancement-layer bit rates are limited below ($N_{avg} - N_{min}$) so that the remaining bandwidth is used to enhance picture quality as much as possible. In an example, when the bandwidth drops below $N_{avg}$, some enhancement layer packets have to be dropped since the instantaneous encoding bit rate is larger than the expected bandwidth. The impact of dropping enhancement layer packets is relatively insignificant. Upon determining the target bit rates of different layers, the packet manager sends the target bit rates to an adaptive video encoder to choose encoding parameters used by the adaptive video encoder. Based on the target bit rates and raw video input, the adaptive video encoder chooses suitable encoding parameters for different layers such that the encoded bit rate of each layer is smaller than the allowed encoding rates of each layer. In some examples, as the estimation of $N_{avg}$ and $N_{min}$ constantly changes over time, the packet manager adjusts the encoding bit rates of different layers accordingly.

For many conventional schemes, a decoder has to receive all video packets of an encoded video bitstream in order to decode the video correctly. Due to low latency constraint for these schemes, a sender is unable to resend the lost or corrupted packets on time and so the receiver has to decode a frame with an incomplete or a corrupted bitstream, which is not robust and reduces video quality.

One or more example embodiments solve these technical problems of conventional schemes by providing technical solutions in which adaptive coding decisions are made based on packet reception status. By way of example, an adaptive video encoder and an adaptive video decoder employ multilayer encoding and decoding algorithm respectively. Uncompressed raw video is transformed into multiple layers of video bitstreams that are further converted into plural layers of bitstream packet with priority for transmission.

In an example embodiment, an adaptive video decoder at a video receiver adaptively decodes each pixel block of a video frame depending on whether an enhancement layer block segment is received. The more enhancement layer packets are received, the higher the picture quality is. By way of example, the video receiver constantly reports packet reception status to the video sender. Based on the most updated reception error as acknowledged, the adaptive video encoder estimates decoding error propagation across each slice of enhancement layers. Therefore, the adaptive video encoder reconstructs reference frames in the same way as the decoder decodes the corresponding frames. Even with packet reception errors, the adaptive video encoder references the same pixel blocks as the adaptive video decoder does when performing inter-frame prediction.

In an example embodiment, it is defined that each frame consists of multiple blocks of pixels. A block bitstream segment is encoded bits that are required to render a pixel block of a $L^{th}$-layer bitstream. Suppose $B_{f,b,L}$ is the block bitstream segment required to decode the $L^{th}$-layer pixel-related data of the $b^{th}$ block of the $f^{th}$ frame. Depending on the coding methods, the $L^{th}$-layer pixel-related data can be the $L^{th}$ layer residuals after performing motion compensation of inter-predicted blocks, the $L^{th}$ layer residual after performing intra prediction of i-blocks or other proper information. A complete block segment can be carried in one packet or it can be divided into multiple partial segments and carried by multiple packets. The video packet contains additional information indicating which layers, which blocks and which frame that each complete or partial block segments is associated with.

Upon receiving bitstream packets, the adaptive video decoder checks which block segments are received and sets each corresponding block segment reception flag to '1' if all bits of the block segment are received and '0' otherwise. The video receiver constantly acknowledges the packet reception status to the video sender. The adaptive video encoder sets the acknowledgement flag of each block segment to '1' if the video receiver acknowledges that all bits of the block segment are received and '0' otherwise.

By way of example, based on the reception flags, the video receiver determines the decoding error flag of each block as follows. Suppose $r_{f,b,L}$ is a reception flag that indicates whether $B_{f,b,L}$ is received correctly. The decoding error flag $d_{f,b,L}$ for $B_{f,b,L}$ is set to '0' if all of the following conditions are true. Otherwise, $d_{f,b,L}$ is set to '1':
1. $r_{f,b,L}=1$, i.e. $B_{f,b,L}$ is received; and
2. the decoding error flags of all depended block segments, i.e. other block segments which $B_{f,b,L}$ depends on, have to be '0'. This condition also implies that the reception flags of all depended block segments are '1'.

By way of example, even if some packets of an enhancement layer L are lost or not received in time, the adaptive video decoder can still recover as many picture details as possible using other L-th layer block segments, which has the corresponding decoding error flags set to '0'.

By way of example, based on the acknowledgement flag $a_{f,b,L}$, which acknowledges that the reception of $B_{f,b,L}$, the adaptive video encoder estimates error propagation at the adaptive video decoder and determines the estimated decoding error flag $e_{f,b,L}$ for each block. The estimated decoding error flag $e_{f,b,L}$, which is estimated by the adaptive video encoder, will be set to '0' if all of the following conditions are met and set to '1' otherwise:
1. $a_{f,b,L}=1$, i.e. $B_{f,b,L}$ is acknowledged;
2. the estimated decoding error flags of all depended block segments, i.e. other block segments which $B_{f,b,L}$ depends on, have to be '0'. This condition also implies that the acknowledgement flags of all depended block segments are '1'.

Figure 5:
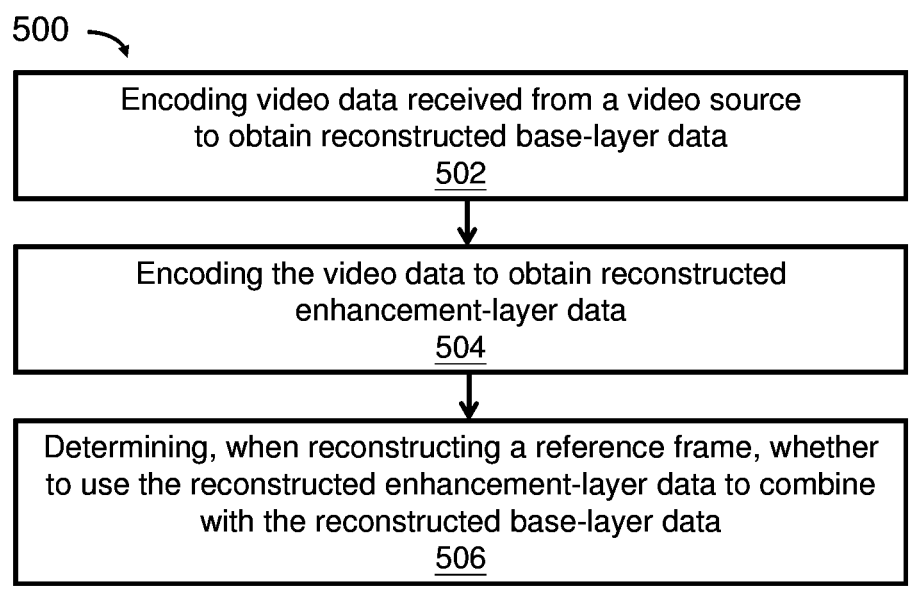
FIG. 5 illustrates an adaptive coding method in accordance with an example embodiment.

FIG. 5 illustrates an adaptive coding method 500 in accordance with an example embodiment. As an example, the method 500 can be executed by an electronic device or computer system, such as the video sender 210 that includes the adaptive video encoder 212 with reference to FIG. 1. The method 500 improves video streaming for example by adaptively deciding whether the enhancement-layer pixel-related data are combined with base-layer pixel-related data for each block when reconstructing reference frames.

Block 502 states encoding video data received from a video source to obtain a reconstructed base-layer data. As an example, this is executed by an adaptive video encoder or a base-layer encoder. Block 504 states encoding the video data to obtain a reconstructed enhancement-layer data. As an example, this is executed by an adaptive video encoder or an enhancement-layer encoder. Block 506 states determining whether to use the reconstructed enhancement-layer data to combine with the reconstructed base-layer data when reconstructing a reference frame. As an example, whether to use the reconstructed enhancement-layer data when generating the reference frame is decided in accordance with an estimated decoding error flag.

Figure 6:
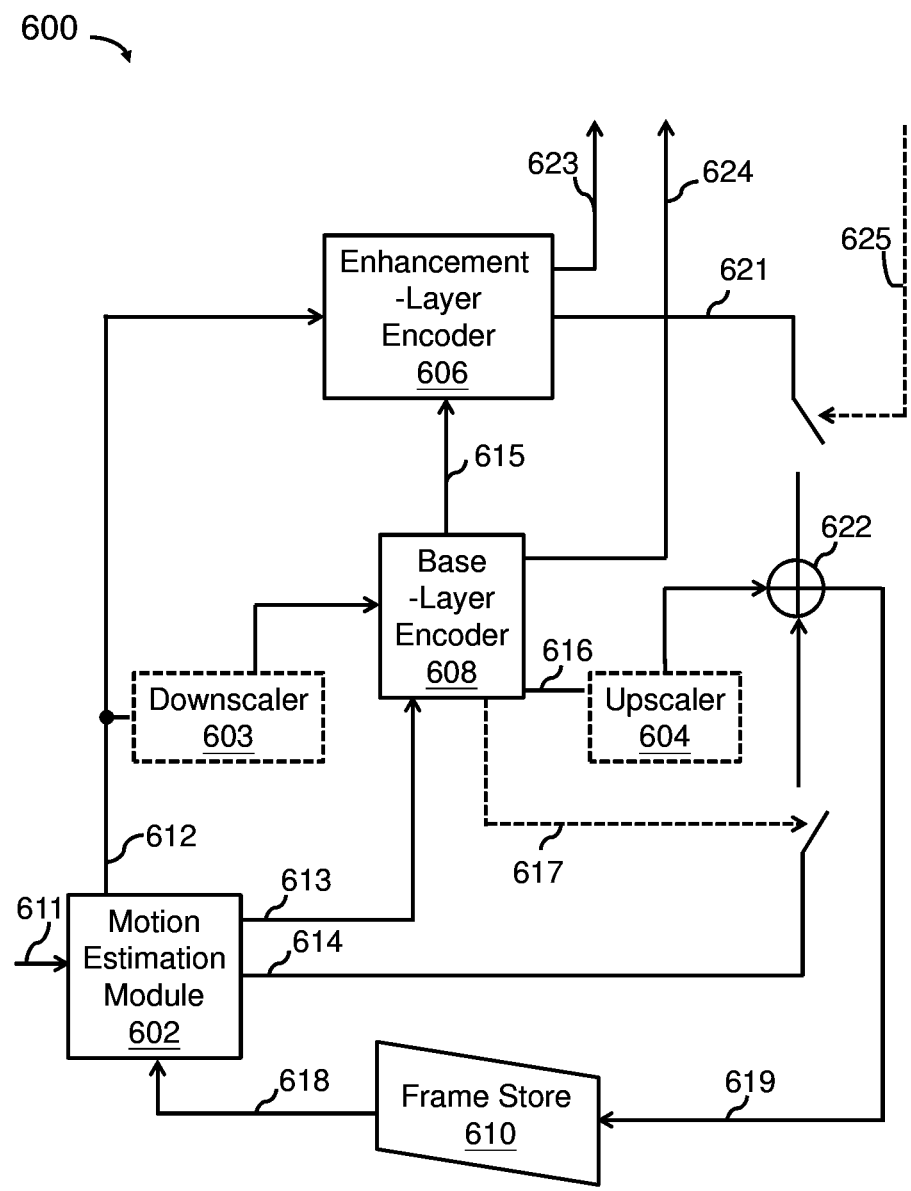
FIG. 6 illustrates an adaptive encoding scheme in accordance with an example embodiment.

FIG. 6 illustrates an adaptive encoding scheme 600 in accordance with an example embodiment. The adaptive encoding scheme 600 shows how the estimated decoding error flag is integrated into an adaptive decision when reconstructing a reference frame.

By way of example, an adaptive video encoder or encoder performs adaptive reference frame reconstruction based on a receiver acknowledgement. Due to the unequal streaming policy of a network adapter, base-layer packets are guaranteed to be received but enhancement-layer packets are not. Therefore, the encoder determines whether enhancement-layer pixel-related data are combined with base-layer pixel-related data for each block when reconstructing reference frames.

In an example embodiment, by comparing a reference frame 618 with an input frame or source frame 611, the motion estimation module 602 finds the best-matching reference block in the reference frame 618. The base-layer encoder 608 encodes base-layer video bitstreams to generate reconstructed base layer pixels or residuals 616. The output of the base-layer encoder 608 is used to generate base-layer bitstream packets 624. In some examples, inter-coding is performed, motion vectors 613 is input to the base-layer encoder 608. In some other examples, the base-layer video bitstream encodes a downscaled-version of source video frame, the base-layer pixel-related data in the intra-block pixels or inter-block residuals 612 are downscaled by a downscaling module or downscaler 603 before inputting to the base-layer encoder 608.

The enhancement-layer encoder 606 encodes the enhancement-layer bitstream to generate reconstructed enhancement-layer pixels or residuals 621. The output of the enhancement-layer encoder 606 is also used to generate enhancement-layer bitstream packets 623. In some examples, inter-coding is performed, motion vectors are used. In some other examples, the enhancement-layer encoder 606 references the base-layer encoding result 615 to perform inter-layer prediction.

In some examples, the base-layer bitstream encodes a downscaled-version of source video frame, the base-layer pixel-related data (i.e., reconstructed base layer pixels or residuals) 616 are upscaled by an upscaling module or upscaler 604 before being used for reconstructing reference frames.

In some examples, if an estimated decoding error flag of an enhancement layer block segment is '0', a decision 625 is made to combine the reconstructed enhancement-layer data 621 with the reconstructed base-layer data 616 at the digital combiner 622 when reconstructing a block of a reference frame to obtain a reconstructed frame 619. Otherwise, only the reconstructed base-layer data 616 are used for reconstructing the reference frame. The reconstructed frame 619 is stored in the frame store 610. In some examples, an intra-/inter-block decision 617 is made as to whether motion compensated pixels 614 are sent to the digital combiner 622 for generating the reconstructed frame 619.

Figure 7A:
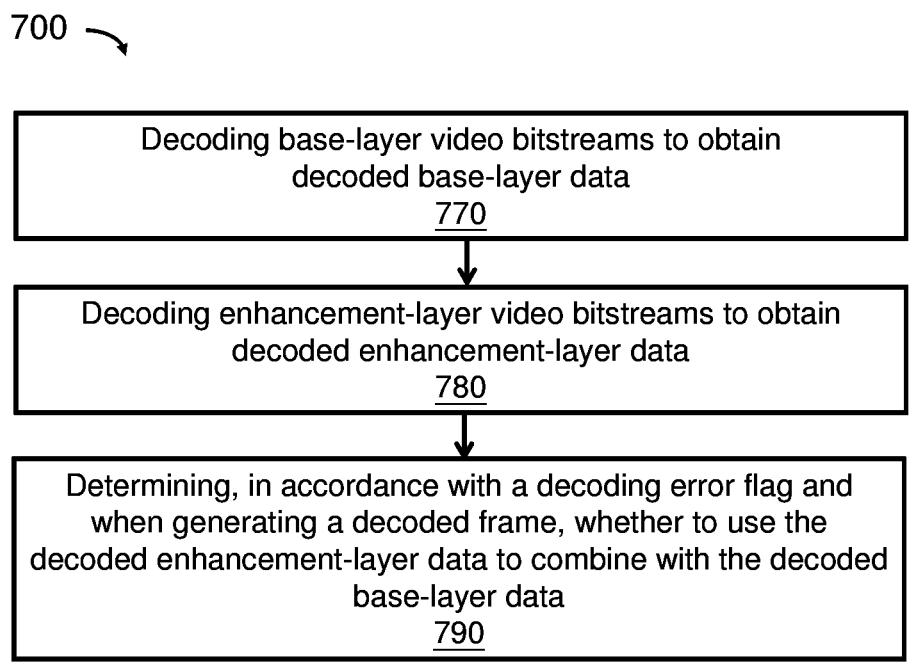
FIG. 7A illustrates an adaptive decoding scheme in accordance with an example embodiment.

FIG. 7A illustrates an adaptive decoding scheme 700 in accordance with an example embodiment. As an example, the adaptive decoding scheme 700 can be executed by an electronic device or computer system, such as the adaptive video decoder 354 with reference to FIG. 3.

By way of example, block 770 states decoding base-layer video bitstreams to obtain decoded base-layer data. As an example, this is executed by an adaptive video decoder or a base-layer decoder. Block 780 states decoding enhancement-layer video bitstreams to obtain decoded enhancement-layer data. As an example, this is executed by an adaptive video decoder or an enhancement-layer decoder. Block 790 states determining whether to use the decoded enhancement-layer data to combine with the decoded base-layer data when generating a decoded frame. As an example, whether to use the decoded enhancement-layer data when generating the decoded frame is decided in accordance with a decoding error flag.

Figure 7B:
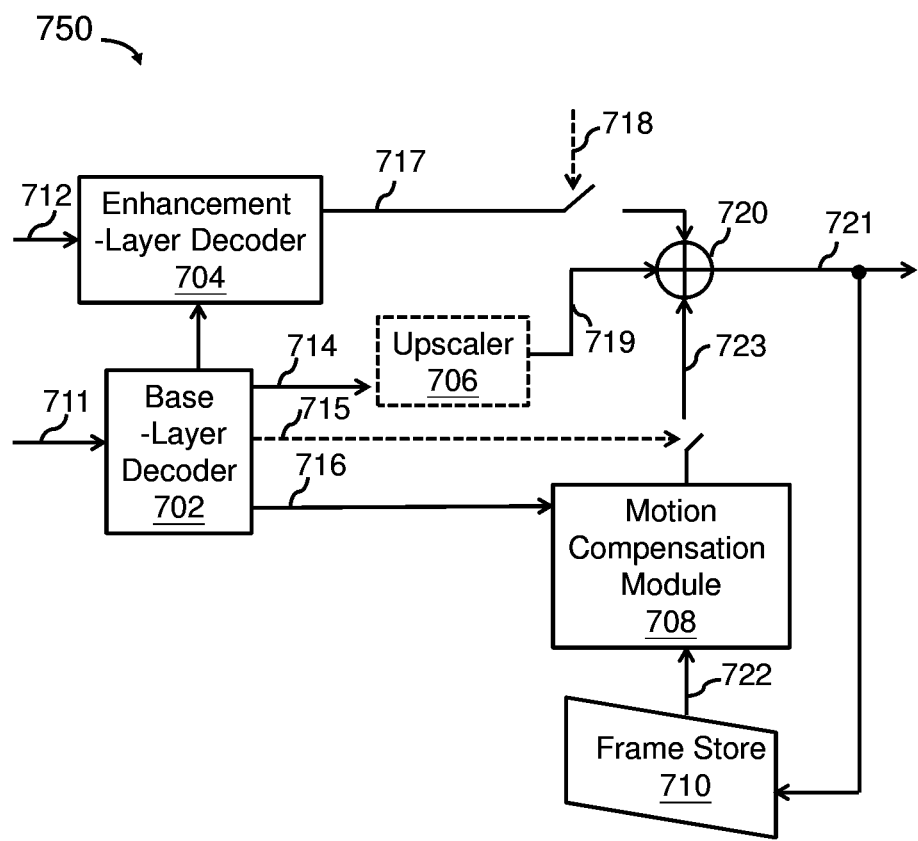
FIG. 7B illustrates an adaptive decoding scheme in accordance with another example embodiment.

FIG. 7B illustrates an adaptive decoding scheme 750 in accordance with another example embodiment. For illustrative purpose, the adaptive decoding scheme 750 shows how a decoding error flag is integrated into a decoding process to make adaptive coding decisions.

As illustrated in FIG. 7B, a base-layer decoder 702 receives base-layer bitstream packets 711 and generates decoded base-layer data, such as base-layer pixels or residuals 714. In some examples, error concealing is performed at the base-layer decoder 702 when a base-layer bitstream packet is lost. The schemes 750 checks a decoding error flag of an enhancement-layer block segment. If the decoding error flag is '0', an enhancement-layer decoder 704 receives enhancement-layer bitstream packets 712 and generates decoded enhancement-layer data, such as enhancement-layer pixels or residuals 717. In some examples, error concealing is performed at the enhancement-layer decoder 704 when an enhancement-layer bitstream packet is lost.

By way of example, the motion compensation module 708 receives motion vectors 716 embedded in the bitstream and performs motion compensation with another block in a reference frame to predict pixels. In some examples, the base-layer video bitstream encodes a downscaled-version of source video frame. The base-layer residuals 714 are upscaled by an upscaling module or upscaler 706 and the output data 719 goes to a digital combiner 720. When upscaling process is unnecessary, the base-layer residuals 714 goes to the digital combiner 720 directly.

By way of example, when the decoding error flag of an enhancement-layer block segment is '0', a decision 718 is made that the decoded enhancement-layer data (e.g., enhancement-layer pixels or residuals 717) and the decoded base-layer data (e.g., base-layer pixels or residuals 714 or 719) are combined at the digital combiner 720 to generate the decoded frame 721. When the decoding error flag of an enhancement-layer block segment is '1', only the decoded base-layer data is used to generate the decoded frame 721.

By way of example, the decoded frame 721 is stored in the frame store 710. A new reference frame 722 can be sent to the motion compensation module 708 for performing motion compensation. As a further example, output 723 of the motion compensation module 708 is input to the digital combiner 720 in accordance with intra or inter block decision 715.

For conventional schemes, if a video source is directly connected with a sink display via a video cable, video synchronization signals (e.g., pixel clock, vsync and Horizontal Synchronization (hsync)), are directly transmitted from the source device to the display device. However, in case of video streaming, the streaming system can stream compressed pixel data but not the synchronization signals. The video output clock of the source device and the video input clock of the sink display, driven by two separate crystals embedded in two separate devices, are not synchronized. Therefore, even if the system manages to reduce the bitstream latency, the actual display latency will become as large as one frame latency over time due to even slight difference between the two clocks. It is also impossible for a sender to send pixel clock to a receiver over a network.

One or more example embodiments solve such technical problems by enabling the video sender or sender and the video receiver or receiver to exchange management packets with each other to ensure that difference between the vsync time of the source device and the vsync time of the sink display is small and bounded, where the terms vsync time refers to the time when the vsync rising edge is detected. Before the two vsync times are synchronized, the TX synchronizer at the sender synchronizes its system time with the system time of RX synchronizer at the receiver. Afterwards, the TX synchronizer performs a vsync synchronization operation including the following two steps:

1. Continuously monitoring the vsync signal of the input video interface and recording the value of the system timer when it detects the vsync rising edge.

2. Putting the timer values in a vsync packet and sending the timer values to the receiver.

The packet manager of the sender continuously repeats the above operations with some time interval between each two successive operations. Therefore, even if the time interval between two vsync increases over time, it can be corrected and minimized upon receiving the most updated vsync packet.

An example embodiment provides a method that expedites execution of video streaming with improved latency. When transmitting video data from a video sender to a video receiver, the example method synchronizes vertical synchronization (vsync) timing of a video output interface with that of a video input interface via exchange of vsync packets between the video sender and the video receiver, thereby reducing video streaming latency.

In some examples, video output interfaces generate vsync rising edge at regular time intervals, where the interval is determined by an electronic counter driven by a local crystal. In some other examples, the RX synchronizer determines next rising edge based on both the expected time interval and the vsync packets. Before video streaming starts, the video sender informs the RX synchronizer the expected time interval between two successive vsync rising edges, denoted as T. The RX synchronizer initializes the time of the next vsync, denoted as $V_R$, as −1, which implies the time of the next vsync is undefined yet. At each clock cycle of the receiver system, the receiver checks if the receiver has received a new vsync packet, which carries the most updated sender vsync time, denoted as $V_s$. If receiving a vsync packet, the receiver set $V_R=V_s+T$. Whenever the current receiver system time equals to $V_R$, the RX synchronizer will output the vsync rising edge and updated $V_R$ such that $V_R=V_R+T$.

One or more example embodiments include an adaptive communication device that possesses at least one network interface to send and receive video packets as if only a single network interface is used.

Different network interfaces use same or different types of physical transceivers. For example, a network interface can be a 2.4 GHz 802.11n Wireless Fidelity (WiFi), 5 GHz 802.11ac WiFi, 4G baseband, Ethernet port, HomePlug, LiFi etc. Each network interface supports at least one channel and is configured to use one of available channels at a given time. For example, a 2.4 GHz 802.11n WiFi interface has 11 available channels of different frequencies and one channel is chosen at a given time. Each network interface continuously monitors the most updated conditions of the selected channels, such as bit error rates, Received Signal Strength Indicator (RSSI), and media access delay etc., and reports these conditions to a channel manager. If the conditions deteriorate too much, the channel manager instructs the network interface to scan other available channels and switch to another channel with more favorable conditions for better communication performance.

Example adaptive communication device is useful for enabling highly reliable communication (such as wireless communication) by enabling channel diversity. The adaptive communication device enables usage of multiple network interfaces to establish multiple channels with different characteristics. As an example, the adaptive communication device has multiple wireless interfaces operating in multiple radio frequency (RF) frequencies. When wireless communication in one frequency is interfered at a particular time, it is likely that a video packet is still able to be sent in another channel using a different frequency.

An example adaptive communication device connects with a host device (such as a video sender or a video receiver as stated above) to provide communication services to the host device. The host device defines service requirements of multiple service classes and how to map each outgoing packet to a service class. As used herein, an outgoing packet is a packet that is output by the host device and received by the adaptive communication device. Upon receiving an outgoing packet from the host device, the adaptive communication device identifies the service class and generates at least one low-level video packet, and dynamically chooses at least one of the most suitable channels that are setup by one or multiple network interfaces to send the low-level packets. Both the low-level packet generation methods and the channel selection depend on the requirements of the service class. In some examples, the adaptive communication device informs a network interface about optimal modulation parameters, channel coding parameters, Quality of Service (QoS) setting and packet length for each low-level packet. In some other examples, when receiving low-level packets from at least one communication channel, a second adaptive communication device regenerates original host packets (i.e., packets output by the host device) and then forwards the original host packets to a host device of the second adaptive communication device.

Figure 8:
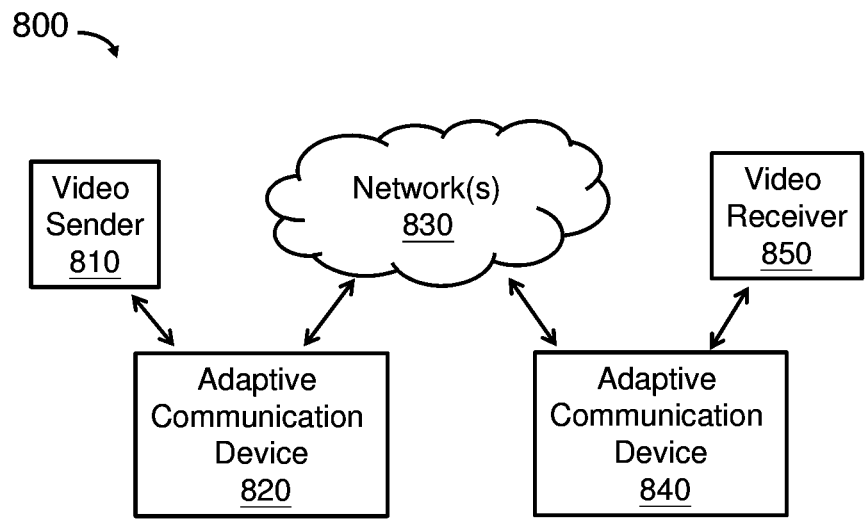
FIG. 8 illustrates an electronic or computer system incorporating adaptive communication devices that executes video streaming in accordance with an example embodiment.

FIG. 8 illustrates a computer or electronic system 800 incorporating adaptive communication devices that executes video streaming in accordance with an example embodiment.

As illustrated, the system 800 includes a video sender 810, a video receiver 850, an adaptive communication device 820 that connects with the video sender 810, and an adaptive communication device 840 that connects with the video receiver 750. The adaptive communication device 820 communicates with the adaptive communication device 840 over one or more networks 830.

In an example embodiment, the video sender 810 and the video receiver 850 use the adaptive communication device 820 and the adaptive communication device 840 respectively in lieu of standard network interfaces such as WiFi. Each of the adaptive communication devices 820 and 840 provides at least a fast data channel and at least a robust back channel. In another example, only one adaptive communication device, either the adaptive communication device 820 or the adaptive communication device 840, is used in the system 800.

By way of example, the video sender 810 and the video receiver 850 define at least the following three packet service classes for unequal video streaming, namely,
1. Base-layer video class,
2. Enhancement-layer video class, and
3. Robust class.

By way of example, base-layer video packets are mapped to the base-layer video class while enhancement-layer video packets are mapped to the enhancement-layer video class. The base-layer video class requirements are high robustness and lower data rates. The enhancement-layer video class requirements are lowest robustness and highest data rates. Based on the base-layer video class requirement, a packet arbiter outputs a parameter set to instruct at least one network interface to generate video packets with high robustness. Based on the enhancement-layer video requirement, the packet arbiter outputs a parameter set to instruct at least one network interface to generate packets at highest data rates. Acknowledgement and management packets are mapped to the robust class and are sent over the robust channel, which supports the highest robustness and the lowest data rates. As an example, the following list shows the robustness requirement of each class in descending order:
1. Robust class,
2. Base-layer video class, and
3. Enhancement-layer video class.

As another example, the following list shows the data rate requirement of each class in descending order:
1. Enhancement-layer video class,
2. Base-layer video class, and
3. Robust class.

Figure 9:
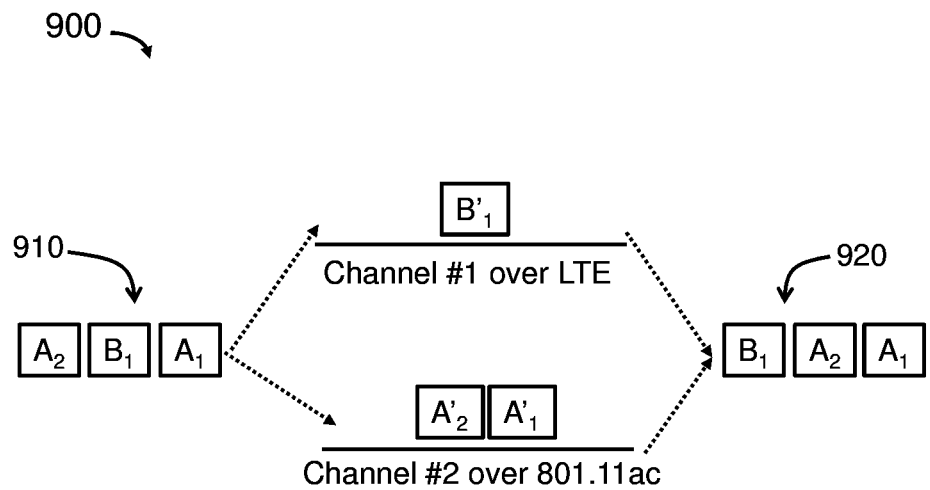
FIG. 9 shows a graph illustrating how two adaptive communication devices communicate for packet transmission in accordance with an example embodiment.

FIG. 9 shows a graph 900 illustrating how two adaptive communication devices communicate for packet transmission in accordance with an example embodiment.

For purpose of description only, the two adaptive communication devices are called sending device and receiving device respectively. By way of example, the sending device receives host packets or packets 910 that include two host packets of service class A (shown as $A_1$ and $A_2$) and one host packet of service class B (shown as $B_1$). The sending device finds that channel 1 established on the Long-Term Evolution (LTE) interface is most suitable to serve class B packets and so the sending device converts $B_1$ to a low-level packet $B'_1$ and sends $B'_1$ via channel 1. The sending device finds that channel 2 established on the 802.11ac interface is most suitable to serve class A packets and so the sending device converts $A_1$ and $A_2$ to low-level packets $A'_1$ and $A'_2$ and sends them over channel 2. The receiving device receives these low-level packets over channel 1 and channel 2 for decoding to obtain the decoded or reconstructed host packets 920 that include same host packets as those of the host packets 910.

One or more example embodiments include an apparatus that executes video streaming with improved performance. The apparatus includes adaptive communication device that has a transmission sub-system. The transmission sub-system includes a packet arbiter, a channel manager, and at least one network transmission interface. By way of example, the channel manager generates instructions for the packet arbiter on basis of packet service class configuration information received from a video sender and channel status statistics received from the at least one network transmission interface. The packet arbiter receives plural layers of bitstream packets from the video sender, generates at least one low-level packet from each bitstream packet of the plural layers of bitstream packets, and selects one or more communication channels to transmit the at least one low-level packet.

Figure 10:
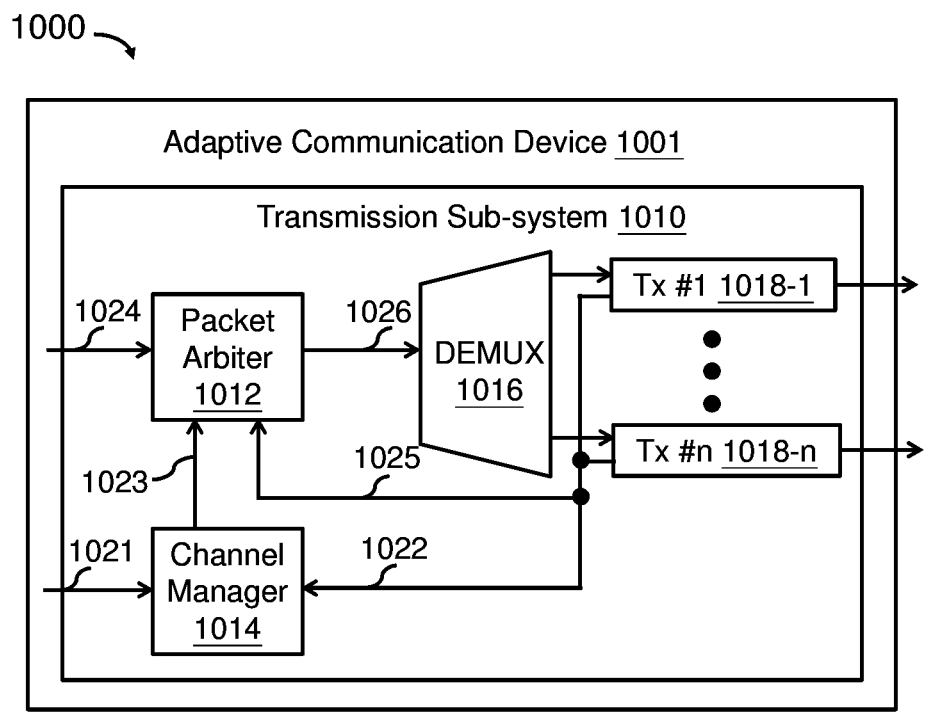
FIG. 10 illustrate an apparatus that executes video streaming in accordance with an example embodiment.

FIG. 10 illustrates an apparatus 1000 that executes video streaming in accordance with an example embodiment.

As illustrated, the apparatus 1000 includes an adaptive communication device 1001 with a transmission sub-system 1010. The transmission sub-system 1010 includes a packet arbiter 1012, a channel manager 1014, a demultiplexer (DEMUX) 1016, and at least one network transmission interface Tx #1 1018-1, ..., Tx #n 1018-n.

By way of example, the channel manager 1014 receives packet service class configuration information 1021 from a host device (such as a video sender) and channel status statistics 1022 from various network interfaces Tx #1 1018-1, ..., Tx #n 1018-n. Based on the information, the channel manager 1014 sends commands 1023 to instruct the packet arbiter 1012 as to how to process the outgoing host packet or host packet 1024 that is received by the packet arbiter 1012 from the host device.

By way of example, the packet arbiter 1012 monitors the instantaneous conditions in multiple channels. Based on the packet service class and various channel conditions 1025, the packet arbiter 1012 generates at least one low-level packets from each host packet (e.g., each bitstream packet of the plural layers of bitstream packets). In some examples, the packet arbiter 1012 determines a set of channel parameters for each low-level packet and selects one or multiple best channels to send packets. The channel parameters includes, but not limited to, channel modulation methods and parameters, channel coding method and parameters, and QoS parameters, etc. The packet arbiter 1012 forwards the low-level packets and the parameter sets 1026 to the DEMUX 1016 that selects at least one network transmission interfaces corresponding to the selected channels.

Figure 11:
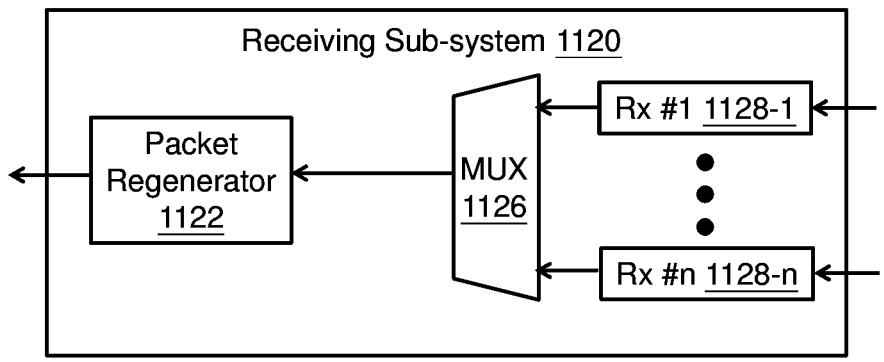
FIG. 11 illustrate a receiving sub-system of an adaptive communication device in accordance with an example embodiment.

FIG. 11 illustrate a receiving sub-system 1120 of an adaptive communication device in accordance with an example embodiment.

As illustrated, the receiving sub-system 1120 includes a packet regenerator 1122, a MUX 1126, and at least one network reception interface Rx #1128-1, ..., Rx #n 1128-n. By way of example, the at least one network reception interface Rx #1 1128-1, ..., Rx #n 1128-n receives the at least one low-level packet from a transmission sub-system and forwards the at least one low-level packet to the packet regenerator 1122. The packet regenerator 1122 receives one or more low-level packets from different network interfaces via the MUX 1126 to regenerates host packets (e.g., original bitstream packet that exists in the plural layers of bitstream packets) and forwards the regenerated host packets to a host device (e.g., a video receiver).

In some examples, a host packet is carried by multiple low-level packets, the packet regenerator 1122 wait for reception of all low-level packets to generate the original high-level packets (i.e., host packet). In some other examples, the packet regenerator 1122 discards a regenerated host packet when it is determined that a same copy of the host packet is received before.

By way of example, a host device (such as a video sender, a video receiver, etc.) defines packet classification methods of how to identify the service class of each host packet, as well as the service requirements for each service class. A packet arbiter (e.g., the packet arbiter 1012) checks packet headers using the classification methods instructed by a channel manager (e.g., the channel manager 1014) to determine the service class of each outgoing host packet in real time. For example, packets with a certain port number are mapped to the video service class and the corresponding service requirements guarantee a throughput of 20 Mbps and a latency of 5 ms. In another example, packets with another port number are mapped to a web service type for web browsing and email checking. There is no requirement on performance guarantee but it is required to minimize power consumption and communication service fee. By way of example, the service requirements includes but is not limited to:

Average packet delays

Maximum packet delay

Sustained throughput

Expected packet error rate

Power used for packet transmission or reception

Network service charge

Security requirement: for example, the host device or host can forbid sending credit card number over any public WiFi network. It can require the adaptive communication device to send packets only over mobile phone network or a trusted WiFi network.

By way of example, upon determining the service class, the packet arbiter generates low-level packet(s) and selects channel(s) to send low-level packet(s) in real time to optimize the performance required by the service class. In some examples, the channel manager sends the following information to the packet arbiters to support these operations:

1. The available modulation and coding methods at each network interface and corresponding bit error rate and physical data rate of each modulation and coding method.

2. The method of how to select at least one channel to send a packet of a particular service class based on instantaneously channel conditions. For example, if the requirement is high reliability, the least noisy channel is selected.

3. The QoS setting or parameters of each service class.

By way of example, the packet arbiter dynamically selects at least one channel which are most suitable channels for each packet based on the instantaneous channel condition and the requirement of the packet service class. When one channel is clearly much better than others, the packet arbiter uses the best channel. In some examples, multiple suitable channels have similar desirable conditions for a service class, the sender sends packets using multiple suitable channels to balance the traffic loading. An example advantage of using multiple physical channels is to disperse the risks of packet loss. It is unlikely that channel conditions of different channels to deteriorate simultaneously and so it is most likely that only the transmission on one of the channel will be affected at a given time, thereby increasing transmission reliability.

One example method of using multiple channels is that the packet arbiter selects a channel among multiple suitable channels in a round robin manner. In this example, the adaptive communication device, denoted as D1, has two WiFi interfaces and uses two non-overlapping WiFi channels A and B respectively. There is another WiFi device D2 that uses the WiFi channel A but does not connect the same access point as D1 does. When the WiFi device D2 is idle, D1 finds that both channels A and B are suitable and so D1 distributes the packet transmission over the two channels. If the WiFi device D2 sends data later and interferes with D1 on channel A, other packets in channel B is unaffected and so the risk of losing all packets is reduced.

In an example embodiment, the adaptive communication device (e.g., the sending device with reference to FIG. 9) break down an outgoing host packet into multiple low-level packets, attaches a sequence number to each low-level packet, and sends them over at least one channel that are most suitable to meet the packet service requirement. Another adaptive communication device, acting as a receiving device, receives low-level packets from different channels and regenerates the original packets following the sequence orders and then forwards the original packets to its host.

In an example, a service class requires exceptionally low packet error rate, and the packet arbiter duplicates multiple copies of a low-level packet and sends each copy of the packet over multiple channels. Each duplicated low-level packet has the same sequence number. The receiving device discards the duplicated low-level packet later.

Figure 12:
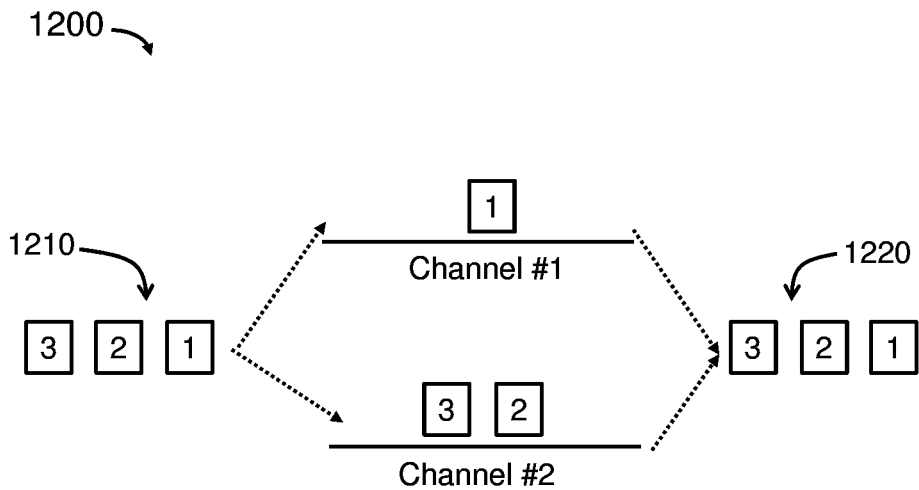
FIG. 12 shows a graph illustrating distributing low-level packets over multiple channels in accordance with an example embodiment.

FIG. 12 shows a graph 1200 illustrating distributing low-level packets over multiple channels in accordance with an example embodiment.

As shown, an outgoing host packet 1210 is broken down into three low-level packets. Packet 1 is sent over channel 1, and packets 2 and 3 are sent over channel 2. Then the receiving device receives the packets 1220 consisting of the same three packets from the two channels.

By way of example, given the operating condition of a selected channel and the service requirements associated with a packet, the packet arbiter determines an optimum parameter set for low-level packet generation, namely, the packet length, the modulation scheme used by the network interface and the forward error correction coding methods and the Quality of Service (QoS) setting. There are lots of combinations of parameter sets, each resulting in different transmission rates and packet error rates. Some modulation schemes, like 64 Quadrature Amplitude Modulation (QAM), have higher physical transmission rates and higher packet error rates while others, like Binary Phase-Shift Keying (BPSK), have lower physical transmission rates and lower packet error rates. As a radio signal attenuates or get interference from other radio frequency (RF) devices, the error rate will increase. In those worse situations, the packet adapter requests the network interface to use a modulation method that has a lower bit error rate, even though it is less efficient. In other case, modulation schemes with higher physical rate should be used. Longer forward error correction codes reduce the packet error rate but also increase the transmission overhead. Long packet lengths increase the transmission efficiency but also increase packet error rate. Therefore, based on the current channel conditions, the packet arbiter adaptively chooses the best parameter set to optimize the service requirement for each packet. If the optimum packet length is smaller than the original packets, the packet arbiter will break down the original packet into multiple shorter low-level packets with the optimum length. In some examples, in order to decide the optimal parameter set, the host device needs to define a packet parameter cost function. Suppose there are two optimization objectives, namely the transmission rate and the packet error rate. The cost function is denoted as $F(t, e)$, where $t$ and $e$ is an expected transmission rate and packet error rate. Suppose $T(p)$ is transmission rate using a parameters set $p$ on a particular network interface while $E(p)$ is the packet error rate using the same parameters set $p$. Based on the cost function, the packet arbiter can find the optimum parameter set $p'$, such that $F(T(p'), E(p'))$ is optimal. The packet arbiter sends both the low-level packets and the optimum packet parameter set $p'$ to a network interface associated with $p'$ to generate and send the low-level packets in the physical medium accordingly.

By way of example, the channel conditions are defined as the information including but not limited to the signal-to-noise ratio, the physical layer (PHY) rate, the bit error rate, the transmission delay, the sustained throughput and other characteristics, etc. Some channel conditions depend on the interface types and/or interface configuration and will not change over time. For example, a communication device using the 900 MHz ISM band has a longer transmission range but a lower bandwidth than a 5 GHz WiFi due to the longer wavelength. Other channel conditions, like signal-to-noise ratio and bit error rate, etc., will change dynamically and each interface has to continuously check the changing conditions of each channel. Different methods can be used to determine these conditions. For example, a device with a WiFi interface can monitor the RSSI. Some user-level applications, like ping, can also be used to check the channel condition like round trip latencies.

By way of example, if the operation condition of a channel is worse than the minimum desirable requirements, the channel manager actively switches to different channels to search for a better channel. Since a network interface cannot change channel and performs packet transmission/reception at the same time, a network interface is unavailable for serving the host device when changing channels and this duration can be quite long for most network interfaces. In case that the adaptive communication device has multiple network interfaces, the packet arbiter can redirect packets to another optimal operating channel not affected by channel switching. After channel switching, if the new setup channel is better than existing channels, the packet arbiter will switch to use the new channel again.

By way of example, the reliability of a channel not only depends on the packet error rates, but also on the time required to detect packet transmission error and resend the packet. In an example, an adaptive communication device, including multiple network interfaces with diversified physical properties, is combined with connection-oriented protocol to further improve the reliability by increasing retransmission efficiency. A receiving device using a connection oriented protocol like Transmission Control Protocol (TCP) uses acknowledgement packets to inform the sending device to resend corrupted data packets. The retransmission delay largely depends on how fast the sending device receives the acknowledgement packet. In one example, an adaptive communication device provides at least one high-speed channels (denoted as the fast data channel) that supports high transmission rate, and at least one slower but more robust channel (denoted as the robust back channel) that supports robust packet transmission with low packet error rates. Hosts of the adaptive communication devices define at least two packet service classes, namely the robust service class and the fast service class. Data packets of a connection oriented protocol belong to the fast class. The acknowledgment packets, which are sent by the receiver to acknowledge data packet reception, belong to the robust service class. Two adaptive communication devices, each setting up fast data channels and robust back channels, exchange data packets and acknowledgement packets with each other via the data channels and robust channels respectively. The service requirement of the fast service class is higher data rate relative to the robust service class. The service requirement of robust service is high reliability. The physical network transceiver or interface that implements the robust channel should have physical properties enabling robust packet transmission, like lower bit error rate, longer range or using less crowded RF frequencies, etc.

By way of example, one type of network transceiver for implementing robust channels is sub-GHz transceiver, such as a sub-GHz ISM transceiver or an 802.11ah device. This type of packet is suitable to be transmitted over sub-GHz channel. For example, the service requirements of robust class is:

1. a bandwidth of at most several hundred kilobits per second
2. a low and predictable delay of ~1 ms.

By way of example, a sub-GHz channel typically provides a bandwidth of 1~2 Mbps. Although the data rate is too low for other common applications like web browsing and video streaming, it is sufficient to send the acknowledgement packets. The sub-GHz channel is more robust than other high-speed transceiver like WiFi, which is optimized for higher physical rate. Sub-GHz wavelength for the sub-GHz channel is longer and so it can travel a longer distance, thus enabling low packet error even at a longer distance. As further example, network interface (such as WiFi, Orthogonal Frequency-division Multiplexing (OFDM), mobile baseband, etc.) are suitable candidates to implement the fast data channels.

By way of example, in some video streaming applications, like game streaming, drone camera video streaming and home video streaming, the video receiver provides a back channel to send interaction signals to enable a user to remote control the device that outputs source video. For example, the back channel of a game streaming system carries the control signals from mouse, keyboard or gamepad to interact with the game console. In drone streaming, the back channel carries signals to remotely control the drone flight operations. In a home video streaming system that streams set-top box video to another TV, the back channel carries infra-red remote control signals to control the set top box. The service requirement of interaction packets is very similar to that of acknowledgement packets. Both require low packet error rates but do not need high data rates. As a result, the adaptive communication device maps both the acknowledgement packets and interaction packets to the robust service class and uses the robust channel to send and receive these two types of packets. In general, the adaptive communication device can assign all types of packets, which require low packet error rates but do not need high data rates, to the robust service class.

To further increase the reliability, an example embodiment duplicates acknowledgement and interaction packets. The receiver and the sender send and receive these packets over the data and robust channels simultaneously in order to further increase the probability of successful reception over either one of the channel. The video sender identifies duplicated packet reception by sequence numbers of low-level packets and discards the duplicated one accordingly.

Figure 13:
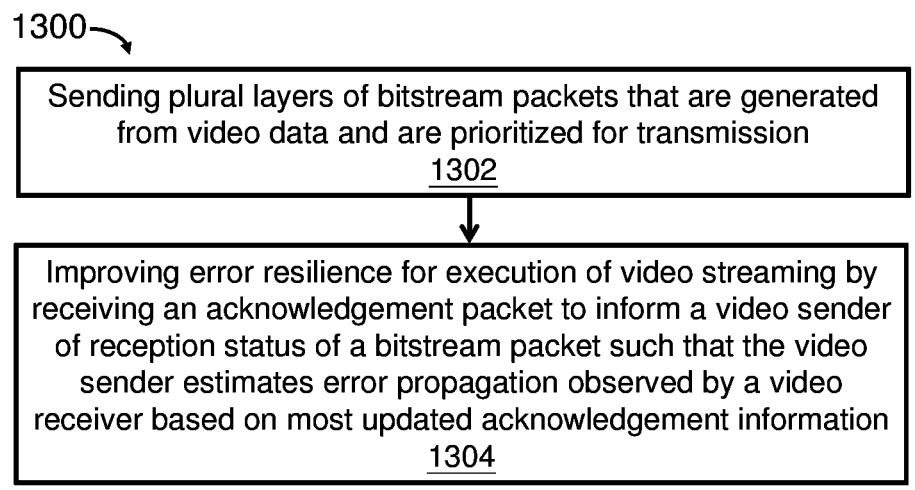
FIG. 13 illustrates a method that executes video streaming in accordance with an example embodiment.

FIG. 13 illustrates a method 1300 that executes video streaming in accordance with an example embodiment. The method 1300 executes video streaming with improved performance such as improved reliability and error relicense.

Block 1302 states sending plural layers of bitstream packets that are generated from video data and are prioritized for transmission. As an example, the plural layers of bitstream packets include base-layer packets and enhancement-layer packets. The base-layer packets belong to lower layers and have higher priority for transmission, which the enhancement-layer packets belong to high layers and have lower priority for transmission.

Block 1304 states improving error resilience for execution of video streaming by receiving an acknowledgement to inform the video sender of reception status of a bitstream packet. For example, when observing a transmission failure or error for a particular bitstream packet, the video receiver generates an acknowledgement packet to inform the video sender of the error. Base on such most updated acknowledgement information, the video sender estimates error propagation and takes actions accordingly, such as resending the bitstream packet to the video receiver such that lower layer packets have higher priority.

Figure 14:
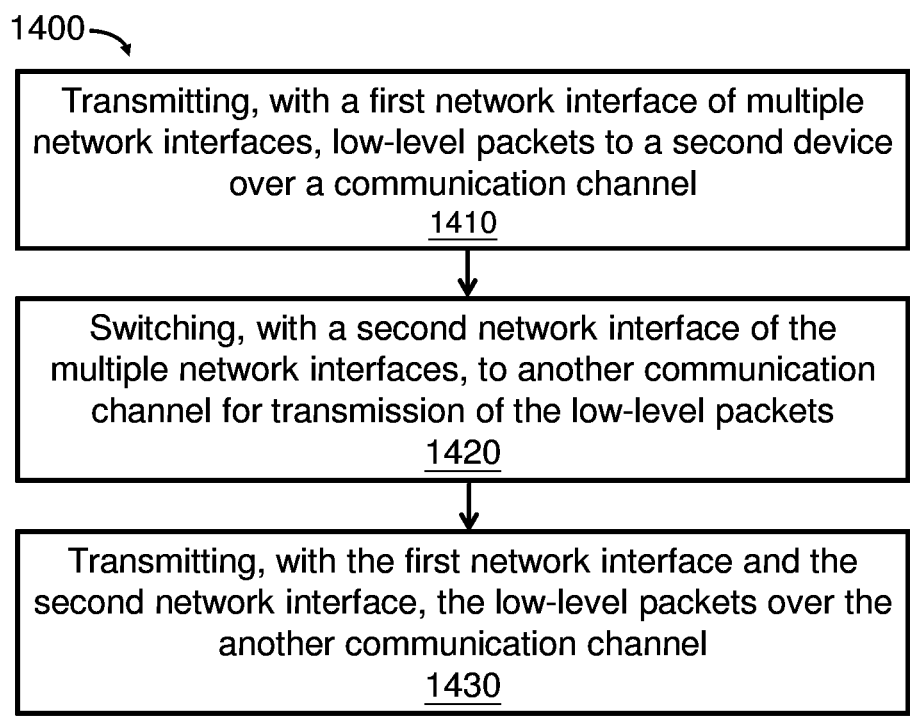
FIG. 14 illustrates a method that executes video streaming in accordance with another example embodiment.

FIG. 14 illustrates a method 1400 that executes video streaming in accordance with another example embodiment.

By way of example, the method 1400 can be executed by an adaptive communication device, such as the adaptive communication devices 820 or 840 with reference to FIG. 8, or the adaptive communication devices 1001 with reference to FIG. 10. For illustratively purpose only, the adaptive communication device includes multiple network interfaces to facilitate adaptive channeling. For example, when one network interface is sending data (e.g., video packet), another network interface is switching to better channels. After finishing the channel switching, both network interfaces can be used to send data.

Block 1410 states transmitting, with a first network interface of the multiple network interfaces, low-level packets generated by the adaptive communication device to a second device over a communication channel. For example, the low-level packets are converted by the adaptive communication device from video packets or bitstream packets. The second device can be a receiver, such as the video receiver 350 with reference to FIG. 3.

Block 1420 states switching, with a second network interface of the multiple network interfaces and in accordance with channel conditions, to another communication channel for transmission of the low-level packets. The second network interface is different from the first network interface. By way of example, the channel conditions are information including but not limited to the signal-to-noise ratio, the physical layer (PHY) rate, the bit error rate, the transmission delay, the sustained throughput and other characteristics, etc. When channel conditions for the communication channel over which packets are transmitted are undesirable, the second network interface switches to another communication channel with better channel conditions to facilitate packet transmission with improved reliability.

Block 1430 states transmitting, with the first network interface and the second network interface, the low-level packets over another communication channel. For example, after completion of channel switching, both network interfaces are used to transmit the low-level packets over the channel with better channel conditions.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used here, the terms "video packet" and "bitstream packet" are used interchangeably, and refer to a packet that is encoded or generated from a video bitstream or bitstream.

As used herein, a "video sender" is a device that transmits audio and/or video signals or data from one location to another. A "video sender", for example, receives data from a source device (e.g., video camera) and encodes the data for transmission.

As used herein, a "video receiver" is a device that receives audio and/or video signals or data from another device (e.g., a video sender).

As used herein, a "vsync packet" is a packet that carries system time when the vsync rising edge is observed by the video sender.

As used herein, an "acknowledgement packet" is a network packet that includes information indicating whether a packet, message, or segment is received or not.

As used here, "system time" refers to a computer system's notion of passing of time. For example, system time can be measured by a system clock that is typically implemented as a simple count of the number of ticks that have transpired since some arbitrary starting date.

As used herein, "sender system time" refers to system time of a video sender. "Receiver system time" refers to system time of a video receiver.

As used herein, "low-level packet" is generated with parameters that optimize bitrate and reliability based on the requested service class.

As used herein, "display deadline" refers to the time when some raw pixels are decoded with the packet data and should be sent to the video output interface.

As used herein, "packet deadline" equals to "display deadline subtracting the expected packet transmission latency".

As used herein, "video quality" and "picture quality" are used interchangeably. "Video quality" is a characteristic of a video passed through a video transmission/processing system, a formal or informal measure of perceived video degradation (typically, compared to the original video).

As used herein, "usable network bandwidth" is network bandwidth that is available to be used for data transmission.

What is claimed is:

1. An apparatus that improves video streaming, comprising:
    an adaptive communication device that includes a transmission sub-system, the transmission sub-system including:
    a packet arbiter that receives plural layers of bitstream packets from a video sender, generates at least one low-level packet from each bitstream packet of the plural layers of bitstream packets, and selects one or more communication channels to transmit the at least one low-level packet;
    at least one network transmission interface that communicates with the packet arbiter; and
    a channel manager that communicates with the packet arbiter and the at least one network transmission interface by sending available modulation, coding methods, and corresponding bit error rate, generates instructions for the packet arbiter on basis of packet service class configuration information received from the video sender and channel status statistics received from the at least one network transmission interface,
    wherein the packet service class comprises three service classes, including base-layer video class, enhancement-layer video class, and robust class.

2. The apparatus of claim 1, wherein the adaptive communication device further includes a receiving sub-system, the receiving sub-system communicating with the transmission sub-system and including:
    at least one network reception interface that receives the at least one low-level packet from the transmission sub-system; and
    a packet regenerator that receives the at least one low-level packet via the at least one network reception interface, generates an original bitstream packet that exists in the plural layers of bitstream packets from the at least one low-level packet, and transmits the original bitstream packet to a video receiver.

3. The apparatus of claim 1, further comprising another adaptive communication device that includes at least one network interface to provide at least one communication channel such that the another adaptive communication device receives the at least one low-level packet from the adaptive communication device and reconstructs the low-level packet into an original bitstream packet that exists in the plural layers of bitstream packets.

4. A method that is executed by an adaptive communicate device to optimize reliability and data rates of packets of different service classes, wherein the adaptive communication device includes:
    a transmission sub-system that includes at least one network transmission interface, and depending on the service class of host packets and observed channel status statistics, generates at least one low-level packet that optimize the data rates and reliability, and selects one or more communication channels to transmit the at least one low-level packet; and
    a receiving sub-system that communicates with the transmission sub-system and includes a packet regenerator and at least one network reception interface, the at least one network reception interface receiving the at least one low-level packet and forwarding the at least one low-level packet to the packet regenerator, the packet regenerator generating an original host packets and discards a regenerated host packet when it is determined that a same copy of the host packet is received before.

5. The method of claim 4, further comprising:
    associating, by the adaptive communication device, a sequence number with the each low-level packet;
    duplicating, by the adaptive communication device, one or more copies for the each low-level packet with each copy having a same sequence number; and
    selecting, by the adaptive communication device, plural communication channels that best satisfy packet service requirement for transmitting each copy of the one or more copies for the each low-level packet and the sequence number.

6. The method of claim 4, further comprising:
    determining, by the adaptive communication device that has a first communication channel that supports higher data transmission rate and a second communication channel that supports robust data transmission with lower packet error rates, an optimum parameter set for low-level packet generation.

7. The method of claim 4, further comprising:
    providing the adaptive communication device with multiple network interfaces that include a first network interface and a second network interface;
    transmitting, with the first network interface of the multiple network interfaces, low-level packets generated by the adaptive communication device to a second device over a communication channel;

switching, with the second network interface of the multiple network interfaces that is different from the first network interface and in accordance with channel conditions, to another communication channel for transmission of the low-level packets; and transmitting, with the first network interface and the second network interface, the low-level packets over the another communication channel after switching.

8. An adaptive coding method executed by an electronic system that executes video streaming with improved reliability, comprising:

encoding, by a base-layer encoder in the electronic system, video data received from a video source to obtain reconstructed base-layer data;

encoding, by an enhancement-layer encoder in the electronic system, the video data to obtain reconstructed enhancement-layer data;

determining, by the electronic system and when reconstructing a reference frame, whether to use the reconstructed enhancement-layer data to combine with the reconstructed base-layer data;

decoding, by a base-layer decoder in the electronic system, base-layer video bitstreams to obtain decoded base-layer data;

decoding, by an enhancement-layer decoder in the electronic system, enhancement-layer video bitstreams to obtain decoded enhancement-layer data; and determining, by the electronic system and in accordance with a decoding error flag and when generating a decoded frame, whether to use the decoded enhancement-layer data to combine with the decoded base-layer data.

9. The adaptive coding method of claim 8, further comprising:

receiving, by a decoder in the electronic system, plural layers of video bitstreams that include base-layer video bitstreams and enhancement-layer video bitstreams, wherein the base-layer video bitstreams have higher priority for transmission compared with the enhancement-layer video bitstreams;

decoding, by the decoder, the base-layer video bitstreams to obtain decoded base-layer data;

decoding, by the decoder, the enhancement-layer video bitstreams to obtain decoded enhancement-layer data; and improving reliability for video streaming by combining, by the decoder and in accordance with decoding error bits, the decoded base-layer data and the decoded enhancement-layer data to generate a decoded frame.

10. A method that expedites execution of video streaming with improved latency, the method comprising:

improving latency for video streaming by synchronizing vertical synchronization (vsync) timing of a video output interface with that of a video input interface via exchange of vsync packets between a video sender and a video receiver when transmitting video data from the video sender to the video receiver, wherein the video receiver controls a timing of the video receiver by estimating a timing of the video sender in order to synchronize with the video sender, thereby reducing latency and improving performance for video streaming.

11. The method of claim 10, further comprising:

receiving, by the video receiver, an expected time interval between two successive vsync rising edges for vsync signals;

initializing, by the video receiver, time of next vsync signal;

checking, by the video receiver and at each clock cycle, whether a new vsync packet that carries updated video sender vsync time is received; and improving latency by updating, by the video receiver, the vsync time of the video output interface.

12. A method that expedites execution of video streaming with improved error resilience, comprising:

sending, from a video sender to a video receiver, plural layers of bitstream packets that are generated from video data, wherein the video sender includes an adaptive video encoder, the video receiver includes an adaptive video decoder;

prioritizing, by the video sender, the plural layers of bitstream such that a bitstream packet being a lower layer of the plural layers of bitstream packets has higher priority when being transmitted to the video receiver;

improving, by the video sender, error resilience for execution of video streaming by receiving from the video receiver an acknowledgement packet that is transmitted to the video sender to inform the video sender of reception status of the bitstream packet such that the video sender estimates error propagation observed by the video receiver based on most updated acknowledgement information and reconstructs reference frames to eliminating discrepancy between the reference frames of the adaptive video encoder of the video sender and decoded frames of the adaptive video decoder of the video receiver;

resending, by the video sender and when detecting transmission errors from an acknowledgement packet, bitstream packets of the plural layers of bitstream packets to the video receiver, wherein lower layer packets have higher priority of transmission;

discarding, by the video sender and when a bitstream packet determined as being outdated, the bitstream packet; and discarding, by the video sender and when a bitstream packet is positively acknowledged, the bitstream packet.

13. The method of claim 12, further comprising:

storing the plural layers of bitstream packets into one or more packet buffers of the video sender to obtain buffered bitstream packets;

grouping the buffered bitstream packets into plural queues such that a buffered bitstream packet of a same layer is put in a same queue;

assigning a display deadline for each buffered bitstream packet;

scanning from a queue associated with lowest layer of bitstream packets to a queue associated with highest layer of bitstream packets;

determining a first queue that has at least one eligible buffered bitstream packet; and selecting from the first queue an eligible buffered bitstream packet with earliest transmission deadline for transmission.

14. The method of claim 12, further comprising:

applying, by the video sender, more robust modulation scheme to lower layer of the plural layers of bitstream packets;

applying, by the video sender, longer forward error correction code to the lower layer of the plural layers of bitstream packets;

selecting, by the video sender, shorter packet length for the lower layer of the plural layers of bitstream packets; and assigning, by the video sender, a quality of service tag to the lower layer of the plural layers of bitstream packets such that the lower layer gets better network service.

* * * * *